United States Patent [19]

Gazda

[11] 4,008,135
[45] Feb. 15, 1977

[54] METHOD OF DEIONIZING SOLUTIONS

[76] Inventor: Hans Otto Ernst Gazda, Anton Kriegerg. 155, A 1238 Vienna, Austria

[22] Filed: Feb. 22, 1974

[21] Appl. No.: 444,703

[52] U.S. Cl. .............................. 204/149; 204/130; 204/180 R; 204/186; 204/300 R; 210/380 R; 233/27
[51] Int. Cl.² .......................................... C02B 1/82
[58] Field of Search ............... 204/180 R, 299, 186, 204/300, 149, 130; 210/380, 243, 65; 233/27

[56] References Cited
UNITED STATES PATENTS

| | | | |
|---|---|---|---|
| 3,197,394 | 7/1965 | McEven | 204/186 |
| 3,247,091 | 4/1966 | Stuetzer | 204/299 |
| 3,277,631 | 10/1966 | Sunnen | 55/3 |

OTHER PUBLICATIONS

Robinson et al., "Electrolyte Solutions," (1959), pp. 118 & 119.
Ellis, "Fresh Water From the Ocean," (1954), pp. 40-43.
Moore, "Physical Chemistry," 3rd Ed., Prentice-Hall Chemistry Series, (1965), pp. 334, 335, 344, 345, 351, 357, 359, & 360.

*Primary Examiner*—John H. Mack
*Assistant Examiner*—A. C. Prescott
*Attorney, Agent, or Firm*—Karl F. Ross; Herbert Dubno

[57] ABSTRACT

A method of deionizing a solution in which the solution is accelerated through a passage which has alternating narrow and wide portions. One side of the passage is maintained at a higher electrical potential than the other side and the ions migrating to opposite sides of the passage are allowed to pass into subsidiary channels and thereby leave the passage.

2 Claims, 2 Drawing Figures

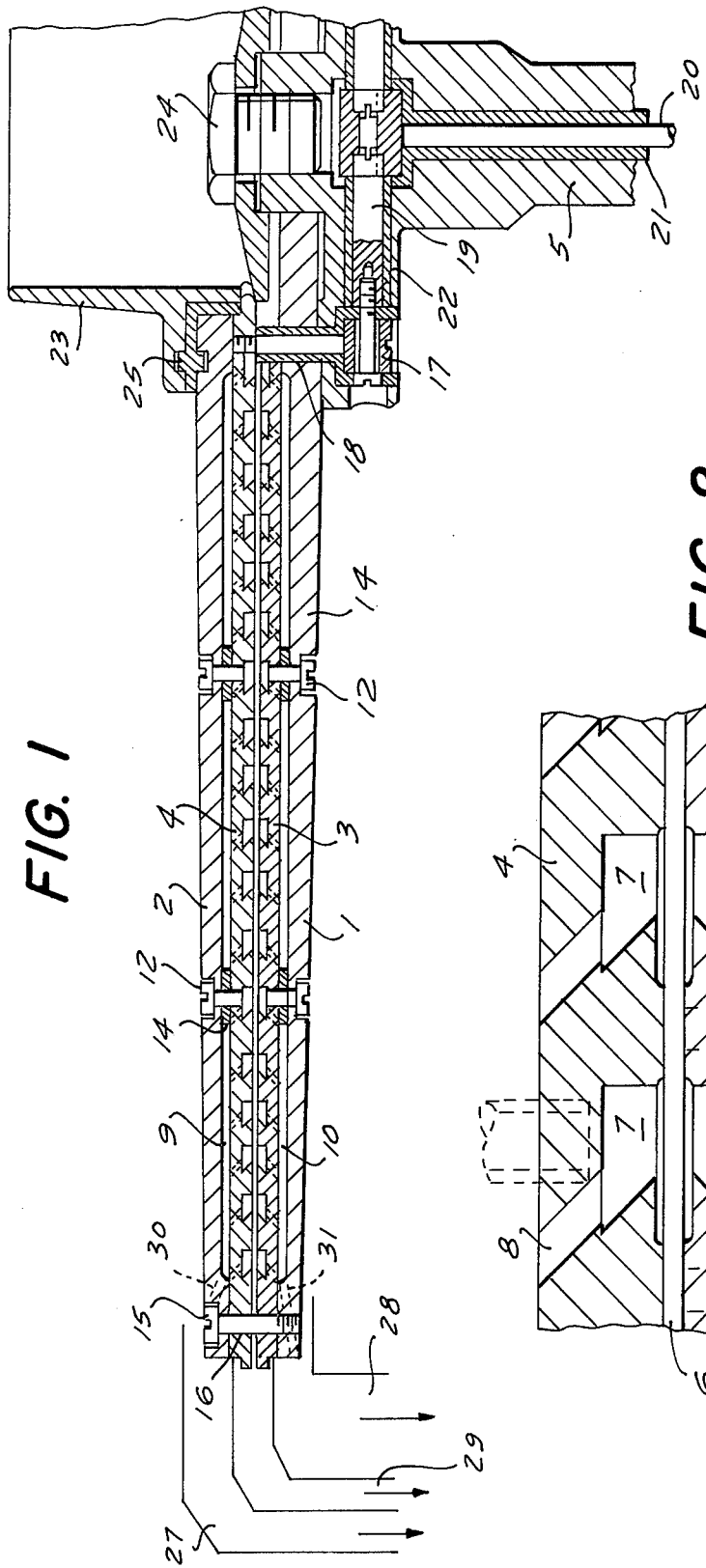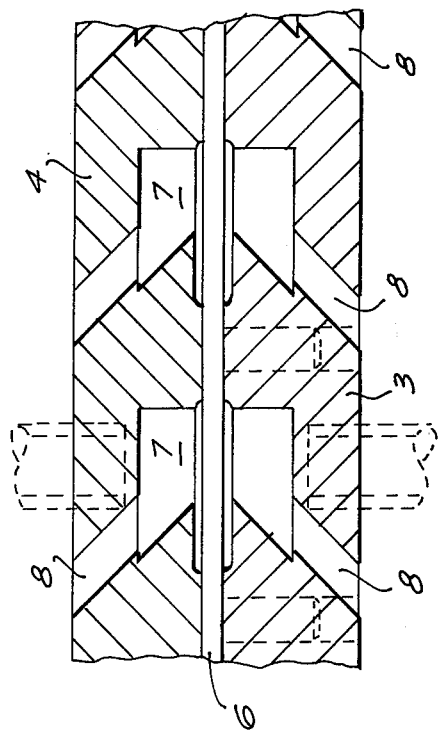

METHOD OF DEIONIZING SOLUTIONS

This invention relates to the de-ionizing of solutions and particularly, but not exclusively, to the desalination of sea water.

Numerous methods have been proposed for desalinating sea water but these generally require installations involving high capital and operating costs so that their use for obtaining large volumes such as are required for land irrigation has hitherto been of little practical importance.

It is an object of the invention to provide a method of and apparatus for de-ionizing solutions, which obviate or mitigate these disadvantages.

According to a first aspect of the present invention there is provided a method of de-ionizing a solution, comprising accelerating the solution through a passage which has alternating narrow and wide portions and one side of which is at a relatively higher electrical potential than the other side, the ions migrating to opposite sides of the passage being allowed to leave the passage to flow in subsidiary channels.

Preferably, the liquid is subjected to such high acceleration forces that it evaporates in the gaps and chambers. This facilitates the separation of ions. Preferably, also, the acceleration force is centrifugal.

According to a second aspect of the present invention there is provided apparatus for de-ionizing a solution, comprising a passage having alternating narrow and wide portions, means for accelerating the solution through said passage, means for producing a potential difference across said passage, and subsidiary channels to opposite sides of said passage for receiving flows of ions migrating from said passage.

Preferably, the apparatus has a rotor having an annular internal passage for a radially outward flow of the solution from a central inlet to a peripheral outlet, said passage being defined by a pair of annular discs located between a pair of electrically conductive plates one of which is adapted to function as a cathode while the other is adapted to function as an anode and each of which defines with the adjacent disc an annular subsidiary channel for receiving a flow of ions migrating from the passage through openings in said discs.

An embodiment of apparatus of this kind was used for the treatment of normal sea water and also a saline solution of high concentration and potable water was obtained. The production costs of apparatus according to the invention are only a small fraction of a modern large installation of known type and equally favourable is the capital cost per cubic meter of water treated.

The invention will now be further described by way of example only with reference to the accompanying drawings, in which:

FIG. 1 is a section of part of a machine for carrying out the method according to the invention, and FIG. 2 is a section of a fragment of the machine to an enlarged scale.

The illustrated machine is effectively an ultracentrifuge similar to that described in Austrian Patent Specification No. 238,697.

The rotor of the centrifuge is generally disc-shaped and comprises a lower portion 1 and an upper portion 2 between which are clamped two nozzle plates 3, 4 defining the nozzles therebetween. This arrangement is carried by the centrifuge shaft 5 the bearing and drive of which are not illustrated since these may be conventional. FIG. 2 shows that the nozzle plates 3, 4 leave an annular narrow gap 6 therebetween and define annular chambers 7 into which lead discharge channels 8 which enter spaces 9 and 10 (FIG. 1) above and below the plates 3, 4 where the liquid enriched with the ions in question accumulates. The enriched liquid is removed from the spaces 9 and 10 via apertures 30, 31 leading outwardly into discharge conduits 27 and 28 whereas the desalted liquid flows into the channel 29, as will be described in greater detail below.

The upper and lower portions 1, 2 are electrically insulated from each other and serve for applying the voltage for establishing the electrical field. The plates 3 and 4 are mounted in an insulated manner or are made of insulating material. These plates 3, 4 are secured to their associated upper or lower portions 1, 2 by means of screws 12 with the intermediary of spacer rings 14. The portion 1 and 2 are attached to each other in the peripheral region by means of a plurality of through screws 15 each of which is electrically insulated from the portion 2 by means of a bush 16 of insulating material so as to prevent short circuits. In the central region the attachment is effected by similar screws (not shown). Further screws 17 serve additionally for current supply and are also insulated in a bush 18 for this purpose and are connected by further insulated connecting elements 19 with a similarly insulated central electrical conductor 20, the parts 21 being insulating sleeves. The water to be treated is introduced into a beaker-shaped inlet 23 which is secured to the drive shaft 5 by means of a central locking screw 24. An insulating bush 25 separates this beaker electrically from the upper portion 2 which must be maintained at a different polarity from the lower portion 1.

As already mentioned, the present centrifuge is based upon the principle of mass separation assisted by the selective effect on the various cations and anions produced by the cathode and anode. As regards the mechanical operation of the apparatus reference can be made to the description of Austrian Patent Specification No. 238,697. As regards the electrical operation of the apparatus, this is as follows:

Static charges are produced in the centrifuge which are directed into the correct paths by means of a controlled charging.

By means of the applied potential a separation of the sodium chloride solutions between the electrodes occurs. The metal Na+ reacts at the cathode with the water to form caustic soda and hydrogen.

Chlorine is liberated at the anode.

The separation of the sodium chloride from the water occurs stepwise from nozzle ring to nozzle ring until water without any appreciable sodium chloride content leaves the last nozzle.

The characteristic properties of electrolytes (salts, acids, bases) are determined by the electrolytic dissociation of the dissolved materials into ions.

The driving force for the dissociation of the electrolytes is the energy gain on hydration of the ions produced.

The ions move in the electrical field with a given speed and if this is related to a field of 1v/cm the ion mobility is obtained. This depends upon pressure, temperature, concentration and medium.

The tables of Harned-Owen show that the mobility of the ions is of the same order of magnitude (with the exception of the very mobile protons (H+) and hydroxyl ions (OH−)).

On conversion into the normal mass system for speed an average migration speed of the ions of about $10^{-3}$ cm/s is obtained.

In the rotating system (centrifuge) the ion mobility is promoted. This is dependent upon the peripheral speed and the geometrical shape of the nozzles in the centrifuge.

Of course a phenomenon occurs in the centrifuge which is known as the "anomoly of strong electroyltes". . (These are inter-ionic electrostatic interaction effects). These inter-ionic attraction and repulsion forces have the result that cations (anions) are to be found with a high degree of probability in the immediate vicinity of an anion (cation). They therefore appear to accumulate about a central ion in the form of an ion cloud whose average radius increases with the dielectric constant and the temperature of the solvent and at low concentrations is inversely proportional to the square root of the concentration. The migration of a central ion is inhibited since the surrounding ion cloud moves in the opposite direction in the electric field and the central ion must therefore overcome an opposed ion stream. Moreover, the migration of the central ion disturbs the symmetry of the ion cloud whereby the central ion is subjected to an electrostatic braking force.

The braking force is dependent upon the number of ions so that the mobility is dependent upon the concentration.

In order to compensate for this interionic electrostatic interaction the centrifuge is charged so as to promote drift of the ions.

Since mass action forces occur in the centrifuge and a directed separation is introduced by the arrangement of the separating nozzles, a voltage of about 10 – 15% of previous methods (e.g. electrodialysis) is necessary. The voltage is also dependent upon the desired throughput, i.e. upon a slower or more rapid separation.

In one example, the method according to the invention was applied to a solution of cooking salt. In the following table the characteristics of the solution before desalination are compared with those after desalination:

|  | Salt Solution | Desalinated Water |
|---|---|---|
| Hydrogen ion concentration | 8.0 | 6.5 |
| Electrolytic conductivity | 1560 | 235 |
| Total hardness in ° d.H | 7.7 | 0 |
| Carbonate hardness in ° d.H | 7.5 | 0.(0.6) |
| Non-carbonate hardness in ° d.H err | 0.2 | 0 |

-continued

|  | Salt Solution | Desalinated Water |
|---|---|---|
| Total alkali (m-value) mval | 2.68 | 0.22 |
| Chloride ion ($Cl^-$) mg/l | 5850.9 | 78.0 |
| Sulphate ion ($SO_4^{--}$) mg/l | 9.6 | Trace |
| Bicarbonate ion ($HCO_3^-$) mg/l | 148.8 | 13.4 |

It will be appreciated that the illustrated embodiment of centrifuge may be considerably modified without departing from the scope of the invention. It should, however, be noted that the centrifuge rotates at substantial speeds not under 5,000 revs. per minute and up to 50,000 revs. per minute or more. As regards mounting of the rotor the description in the said Austrian Patent Specification applies.

The invention is not limited to the desalination of salt water but may be used in all cases in which the solid to be removed dissociates into ions in solution. This includes the effluent of various industrial processes, e.g. metallurgical processes. The invention is also of considerable importance in the concentration of brine obtained in salt mining. Numerous other applications are possible as will be obvious to the man skilled in the art.

What we claim is:

1. A method of deionizing an ion-containing solution which comprises the steps of:
    a. providing a narrow annular passage with radially spaced coaxial compartments in a pair of confronting coaxial spaced disks defining said passage between them, said disks having opposing walls formed with recess portions constituting said compartments and intermediate portions between said recess portions, the intermediate portions of said walls being mutually spaced by a smaller distance than the confronting recess portions of said walls;
    b. applying an electrical potential difference across said passage between said walls whereby one of said walls is electrically positive and the other of said walls is electrically negative;
    c. accelerating an ion-containing solution through said passages by rotating said disks to centrifugally displace said solution outwardly while the applied electrical potential causes migration of negatively charged ions to migrate to the positively charged wall and positively charged ions to migrate toward the negatively charged wall as said solution passes through said passage; and
    d. continuously channeling the ions which have migrated to the respective walls from the passage through said recesses.
2. The method defined in claim 1 wherein the acceleration force is sufficient to cause evaporation of said solution within said passage.

* * * * *